(12) United States Patent
Denne (10) Patent No.: US 6,770,988 B2
(45) Date of Patent: Aug. 3, 2004

(54) LINEAR ELECTROMAGNETIC MACHINE

(75) Inventor: Phillip Raymond Michael Denne, Bournemouth (GB)

(73) Assignee: Advanced Motion Technologies Inc., Rockville, MD (US)

( * ) Notice: Subject to any disclaimer, the term of this patent is extended or adjusted under 35 U.S.C. 154(b) by 0 days.

(21) Appl. No.: 10/189,203

(22) Filed: Jul. 2, 2002

(65) Prior Publication Data

US 2002/0190582 A1 Dec. 19, 2002

Related U.S. Application Data

(62) Division of application No. 09/529,532, filed as application No. PCT/GB98/03088 on Oct. 14, 1998, now abandoned.

(30) Foreign Application Priority Data

| Oct. 15, 1997 | (GB) | ............................................... 9721747 |
| Oct. 15, 1997 | (GB) | ............................................... 9721748 |
| Jan. 22, 1998 | (GB) | ............................................... 9801237 |

(51) Int. Cl.$^7$ ............................................. H02K 41/00
(52) U.S. Cl. ..................................................... 310/12
(58) Field of Search ............................. 310/12, 13, 14, 310/51, 216, 217

(56) References Cited

U.S. PATENT DOCUMENTS

| 4,845,392 | A | * | 7/1989 | Mumbower | ................... 310/14 |
| 5,440,183 | A | * | 8/1995 | Denne | .......................... 310/12 |
| 5,621,259 | A | * | 4/1997 | Multon et al. | ................. 310/12 |
| 5,661,350 | A | * | 8/1997 | Lucidarme et al. | ........... 310/12 |
| 5,955,798 | A | * | 9/1999 | Ishiyama et al. | ............. 310/12 |
| 6,002,191 | A | * | 12/1999 | Saban | ......................... 310/216 |
| 6,313,551 | B1 | * | 11/2001 | Hazelton et al. | .............. 310/12 |

FOREIGN PATENT DOCUMENTS

JP          1-190250      *   7/1989

* cited by examiner

Primary Examiner—Thanh Lam
Assistant Examiner—Judson H. Jones
(74) Attorney, Agent, or Firm—Darby & Darby (57) ABSTRACT

A linear electromagnetic machine for generating a force acting between two members relatively movable along an axis, one of which is capable of producing a magnetic field the direction of at least part of which extends substantially radially of the said axis and the other of which comprises or includes a conductor, conveniently in the form of a coil, in which an electric current can flow substantially perpendicularly of the magnetic field so as to generate a force between the two members substantially parallel to the axis. The radial magnetic field is generated by permanent magnets orientated with their direction of magnetisation axially, the pole pieces acting to concentrate the magnetic flux to follow a radial path through the coils.

20 Claims, 7 Drawing Sheets

LINEAR ELECTROMAGNETIC MACHINE

This is a division, of application Ser. No. 09/529,532, filed Jun. 14, 2000, which is the U.S. National Phase (371) of PCT/GB98/03088 filed Oct. 14, 1998. Each of these prior applications is hereby incorporated herein by reference, in its entirety.

The present invention relates generally to a linear electromagnetic machine and particularly, although not exclusively, to apparatus for producing linear motion.

Although such machines are frequently referred to as "linear actuators" the present invention also comprehends a machine which, although capable of motion, is adapted to maintain a fixed position against a varying force.

A number of designs of linear electromagnetic actuator, (sometimes called a linear motor), are known. Various configurations of previously known machines are described in WO93/01646, which relates to a linear electromagnetic device having axial symmetry and formed as a piston-in-cylinder machine. The principal advantage of that form of construction is that the strong attractive forces between the magnetic elements of the stator and the magnetic elements of the armature are balanced about a central axis, so that the bearings of the machine do not need to withstand resultant magnetically created forces, as is the case with a unilateral so-called linear motor.

A further advantage of an axially-symmetric construction is that the magnetic fields within the machine are contained within an outer casing (which may be steel or other suitable ferromagnetic material) and they can be so arranged as to intersect electrical coils of the machine with a high degree of efficiency. Moreover, in an axially-symmetric construction of cylindrical form it is convenient and practical for the moving member, or armature, to carry a sliding seal between it and the stationary member, or stator of the actuator so as to be able to contain a volume of fluid, at least to one side of the armature, which can act as a supplementary fluid actuator or damper.

For many purposes the most appropriate form of such a machine is that using a permanent-magnet armature and a surrounding stator carrying coils through which electrical currents pass. Preferably the electrical currents are controlled in magnitude and sign by an electronic control system. This configuration allows the heat generated in the windings to pass easily to the external environment and it simplifies the electrical connections to the control system. Important design parameters of such machines are the conformation of the magnetic fields of the armature and the stator, and the choice of the most suitable diameter of the machine for a given stroke and thrust rating.

The thrust generated by an electromagnetic machine may be described by:

$$T = B * I * L$$

where T is the thrust in Newtons, B is the flux density in Tesla, I is the current in the wire in Amps and L is the length of the wire in Meters. It follows directly from this relationship that the volume of copper that must be intersected by the magnetic flux is given by $$V = T/(B * d)$$

where V is the volume in cubic meters and d is the current density in the wire in amps per square meter. It also follows that the electrical power required to produce this thrust when the machine is stationary is given by $$W = T * r * d / B$$

where W is the power in Watts and r is the resistivity in ohm meters.

It will be appreciated, therefore, that the performance of an actuator can be improved by ensuring that the magnetic flux is concentrated as much as possible in the regions where it intersects the coils.

According to one aspect of the present invention, therefore, there is provided a linear electromagnetic machine for generating a force acting between two members relatively movable along an axis, one of which is capable of producing a magnetic field the direction of at least part of which extends substantially radially of the said axis and the other of which comprises or includes a conductor in which an electric current can flow substantially perpendicularly with respect to the said magnetic field over at least part of its path whereby to generate a force between the said two members substantially parallel to the said axis, characterised in that the said means for generating the radial magnetic field comprises a permanent magnet orientated with its direction of magnetisation substantially parallel to the said axis associated with pole pieces for its north and south poles from circumferential surfaces of which the generally radial magnetic field extends.

Early forms of linear electromagnetic machine were of the "ironless" type. That is to say, the copper windings were located directly in the air gap of the magnetic circuit. The air gap had therefore to be large in order to contain, in an acceptable length, the minimum copper volume necessary to produce the required thrust. In order to force the flux across such a large air gap the magnetic length of each associated permanent magnet was also large, so that the volume, weight and cost of the permanent magnetic material was significant. In embodiments of the present invention it is preferred that the axial length of the polepieces should be kept as short as possible in order to maximise the flux density. However, for reasons which will become clearer below, the axial length of the magnets should preferably be less than, and in any event, not substantially greater than the axial length of the polepieces. In attempting to minimise the polepiece axial length, however, a constraint is imposed by the condition that the radial thickness of the air gap (including the copper in an ironless machine) must be approximately half the length of the magnets in order for these to operate at maximum efficiency. There is a limit to the radial "thickness" to which the coils can be reduced and this has to be balanced against the need to minimise the axial length of the polepieces. A particularly effective compromise is achieved when the axial length of the or each magnets, the axial length of each polepiece and the radial "thickness" of the air gap are all substantially the same.

In one embodiment of the present invention, the stator of the linear electromagnetic machine surrounds the armature, and has conductor coils housed within circumferential slots in a ferromagnetic stator body. The hoop resistance of the ferromagnetic stator body, that is the circumferential resistance with respect to induced electrical currents, is increased by means of at least one axially extending channel the depth of which is less than the thickness of the material of the stator body. Preferably the circumferential slots have a symmetrical cyclic contour in the axial direction so as to maintain a constant radial reluctance. The armature is preferably close-fitting to the stator and provided with suitable bearings.

In another aspect the present invention provides a linear electromagnetic machine according to any preceding claims, characterised in that the stator is located radially within the armature and the said ferromagnetic sleeve is located on the radially outer surface of the armature.

The axial spacing, electrical connections and impedances of the coils are so adapted as to permit the machine to be controlled by a suitable electronic drive unit as will be described in more detail below. The means for producing a radial magnetic field may comprise plane discs or rings of magnetic material permanently magnetised in a direction orthogonal to their flat surfaces. The rings are assembled in series along the central axis of the machine with like poles facing one another and having ferromagnetic polepieces interposed so as to concentrate the flux from the opposing magnets and to conduct that flux in a desired radial direction towards the electrical coils. A sleeve of radially-magnetised magnetic material may be positioned at the opposite radial periphery of the magnet rings and polepieces so as to oppose the conduction of the flux in the unwanted direction, there being a ferromagnetic sleeve fitted to said radially-magnetised material on the side thereof remote from the said rings and polepieces.

In another aspect the present invention provides a linear electromagnetic machine according to any preceding claim, characterised in that the coils follow circilinear or rectilinear axially sinuous path circumferentially around the said axis.

Thus, if the electromagnetic actuator includes or is associated with a position transducer providing a signal representative of the relative positions of the armature and the stator, that the electrical coils of the stator may be connected to an electronic drive unit for controlling the magnitude and direction of the currents in the coils so as to cause the desired axially-directed force to be created between the armature and the stator.

Preferably the armature and the stator are of circular cross section and are fitted with suitable gas seals that will permit the device to be pressurised so as to form part of a gas spring when required.

Preferably the electronic drive unit is arranged to produce a signal representative of the current supplied to the actuator, the integral of such signal being used to make adjustments to the pressure of the said gas spring in certain applications.

The most convenient configuration of a linear electromagnetic machine is to form the stator as a cylinder with the coils wound circumferentially and to form the armature with a cylindrical outer surface to slide axially within the inner cylindrical surface of the stator. This configuration may then provide a constant reluctance cylindrical stator.

It is a common error to consider that the piston moves because there is some sort of attractive or repulsive magnetic effect produced by the coils, acting on the armature, as there would be for a solenoid or electromagnet. This is not the case. A force exists in each coil which is the vector product of the current and the magnetic flux density—a reaction force is therefore produced between them which is equal to the vector sum of all the coil forces.

Because the circular electric currents are arranged to be orthogonal to the radial magnetic flux, the forces produced are axial and not rotational. The machine may be considered as being electrically equivalent to a two pole rotary brushless AC servomotor and may therefore be controlled by a very similar drive system.

The principal difficulty in connecting a linear electromagnetic machine as defined herein to such a controller is that the cycle of phases repeats a few times only, within the limits of the linear displacement. This should be contrasted with the equivalent rotary machine, for which the cycle can be made to repeat indefinitely, corresponding with the rotation of the motor shaft. This difficulty is associated with the output signal from the transducer, which must be a linear device which does not always have a rotary equivalent. The linear position signal has to be converted to a cyclic phase command with the appropriate offset to produce optimum thrust.

The present invention also comprehends a linear electromagnetic machine adapted for use with a three phase supply, comprising a stator having a plurality of coils aligned along a common axis, an armature having means for producing a magnetic field extending radially of the said axis and control means for applying electrical currents to the coils the magnitude and direction of which result in the generation of a force between the armature and the stator substantially parallel to the said axis, characterised in that the magnetic field produced by the armature comprises at least two regions of opposite polarity defining the magnetic field period and the axial dimensions of each coil is substantially one sixth of the magnetic period of the armature.

The features of an embodiment of the present invention can be summarised thus:

The armature consists of an axially-alternating sequence of permanent magnets which produce a radial magnetic flux of polarity which alternates axially.

The axial distance between like pole centres on the armature is referred-to as the magnetic period of the machine.

The stator coils are stacked as a series of identical units, each of which has an axial dimension equal to one sixth of the magnetic period.

The coils of the stator are wired as three electrically-isolated phases.

The phases are constructed by allocating every third coil in axial sequence to the same phase and connecting all coils of the same phase in series, but alternately opposite in direction of current flow.

The second coil in each set of three adjacent coils is connected in the opposite sense to that of its neighbours.

The three phases are joined together at a star point, at the end of the distant from the input terminals.

The function of the output stage from the control device is to produce, for any position of the armature, three quasi-dc drive currents—not three continuously-alternating currents The drive currents are arranged to have a zero sum at all times, according to the common relationship equivalent to that of three sinusoidal signals differing in phase by 120° from one another The absolute phase reference of the drive currents is variable under external control The position of the armature is not locked to the absolute phase of the coil currents. That is to say, the position of the piston will not follow the phase command signal at a constant drive current amplitude There is an optimum absolute phasing of the coil currents for maximum thrust at any position of the armature relative to the coil stack. This optimum phasing is a linear function of the piston position and it repeats for every transit of the armature through a magnetic period Changing the absolute phase of the coil currents by 180° reverses the direction of the thrust produced by the armature The actual position of the piston determines the current drive phasing, not the other way round.

The values of the drive currents at any time are defined by:

$I(1)=A*\sin(x+\text{offset})$
$I(2)=A*\sin(x+\text{offset}+2\pi/3)$
$I(3)=A*\sin(x+\text{offset}+4\pi/3)$ where A is the current drive signal, x is the absolute (cyclic) phase command corresponding to the displacement of the piston from a datum position and offset is a preset phasing parameter that relates to the datum itself.

The value of the drive current demand signal is a function of the error between the commanded and actual value of the armature position, the time integral of that error, and the time derivative of that error, as calculated by the servo-controller module.

The ram coils are designed for a specific busbar voltage. That is to say, the coil impedances are determined by the current required to produce the design peak thrust, taking into account the highest speed required (i.e. the back emf value). Rams that are required to operate at high speeds will generally be capable of operating at high peak currents under static conditions and will require a power module that has a larger power rating. (A high speed ram has a greater power output than a slow ram.)

It should be noted that the function of the ram is usually to produce a thrust, rather than to maintain a preset position or a preset speed of movement (although these latter may be acquired in special circumstances. The machine can also be allowed to "freewheel" when necessary, that is to continue its motion without any accelerating or braking thrust. This facility is important because it saves large amounts of energy when positioning inertial loads.

It will be appreciated that conventional PWM control applies a constant-frequency waveform of variable mark-:space ratio to the load, thus appearing to be a low-impedance source of variable voltage. But if, because the permanent-magnet armature is moving, a back-emf is generated by the load coils, the current output will either be lessened (when the armature is moving in the direction of the force) or increased (when the directions of force and travel are opposed.) The inertia that is directly coupled to the armature of a ram can be very large and the power which can be delivered into a coil driver module under braking conditions is considerable.

The drive circuits must therefore be high-impedance current drivers, which can be arranged in two ways. In the first arrangement the pulse width modulator is of the conventional type but includes in the fast control loop a current-sensing element. By this means the voltage output of the modulator follows the back emf of the coils and does not appear as a driving or braking element when the current drive command is zero.

In the second arrangement the two parts of the bridge are pulsed separately. That is to say, for positive current drive only the upper half of the bridge is pulsed whilst the lower remains switched off, and vice-versa. For zero current both parts of the bridge are off and there are no spurious currents when the armature is moving. This system is inherently a high-impedance current drive. It should also be arranged to include a current-sensing element in the control loop, although the current sensor does not need to be as fast as for the responsive voltage-drive system.

It should be noted that, in contrast to fluid power rams, a linear electromagnetic machine formed as a ram is capable of moving an inertial load ballistically, only requiring power for acceleration and deceleration. In certain circumstances much of the deceleration energy may even be delivered back to the DC busbar. The ram efficiency in moving inertial loads may be still further increased by use of gas spring control described hereinafter briefly, and more fully described in the Applicant's copending application PCT/GB98/02823.

If the linear electromagnet machine is connected to another machine, the machine element which is positioned by the armature may be fitted with a transducer of any suitable kind. There are, nevertheless, advantages in arranging for the ram to have its own transducer, fitted within the ram or mounted alongside.

One of the principal advantages of the ram is that it is capable of a very high positioning accuracy, since it has no backlash and no control transport lag. Whilst the overall stroke of the machine may be in the order of a meter, the positioning may be in the order of a micron; a resolution of 20 bits. This is likely to be in the noise of even the best analogue device, so that for any precision application a digital output signal is required from the transducer.

For less precise mechanisms, such as motion bases for entertainment or training purposes, the positioning accuracy needs only to be in the order of millimeters (perhaps 12 bits) and the performance of an analogue transducer is probably adequate. Linear potentiometers are normally designed to work immersed in oil, whereas the electromagnetic ram is dry, so a different, non-contacting type of transducer is to be preferred.

It will be understood that the coil assembly of the stator has to be mounted within the outer cylinder, so that it must either be loaded into the cylinder from one end or the cylinder must be split and the two halves then clamped onto the outside of the coil assembly. In either case it will be appreciated that it is very difficult to ensure firm metal-to-metal contact everywhere between the inner surface of the cylinder and the outer surfaces of the steel from which the slotted stator is built.

It is also necessary to convey large axial forces from the coils into the outer steel cylinder with crushing forces on the surrounding coils. The whole coil assembly is often cast in araldite resin to achieve this but a fault in any one coil then causes the complete assembly to be scrapped.

It is desirable to provide a firm metal-to-metal contact between the radially-directed ferromagnetic elements and the axially-directed ferromagnetic elements of the flux path in the stator and to allow each coil module to be separately manufactured, inspected and serviced if necessary.

In this embodiment the stator of an electromagnetic ram having a slotted steel coil assembly is constructed from a stack of modules having a cylindrical symmetry in that each module comprises a ferromagnetic washer or ring which abuts in the axial direction a coil of wire having an internal diameter approximately equal to the internal diameter of the washer, there being also abutting to the washer in the axial direction a ferromagnetic spacer ring surrounding the coil whose outer diameter is equal to that of the outer diameter of the ferromagnetic washer and whose axial dimension is accurately determined and is approximately equal to the axial dimension of the coil.

Preferably the stack of coil modules forming the stator is clamped together in the axial direction by tie rods outside the ram between end pieces of the ram stator assembly.

Preferably the washers are shaped to a single or repeated ramp form so as to present a constant reluctance to a radially-directed armature magnetic circuit.

Preferably the washers are slotted in a radial direction so as to allow the innermost coil wire to be brought to the outer surface of the stator assembly.

Preferably the spacer ring is notched to allow the end of the outermost coil layer to be brought to the surface of the stator assembly.

Preferably the rings and washers have a detent or alignment device on their outer surfaces so as to facilitate the correct assembly of a stack of coil modules.

Figure 9:
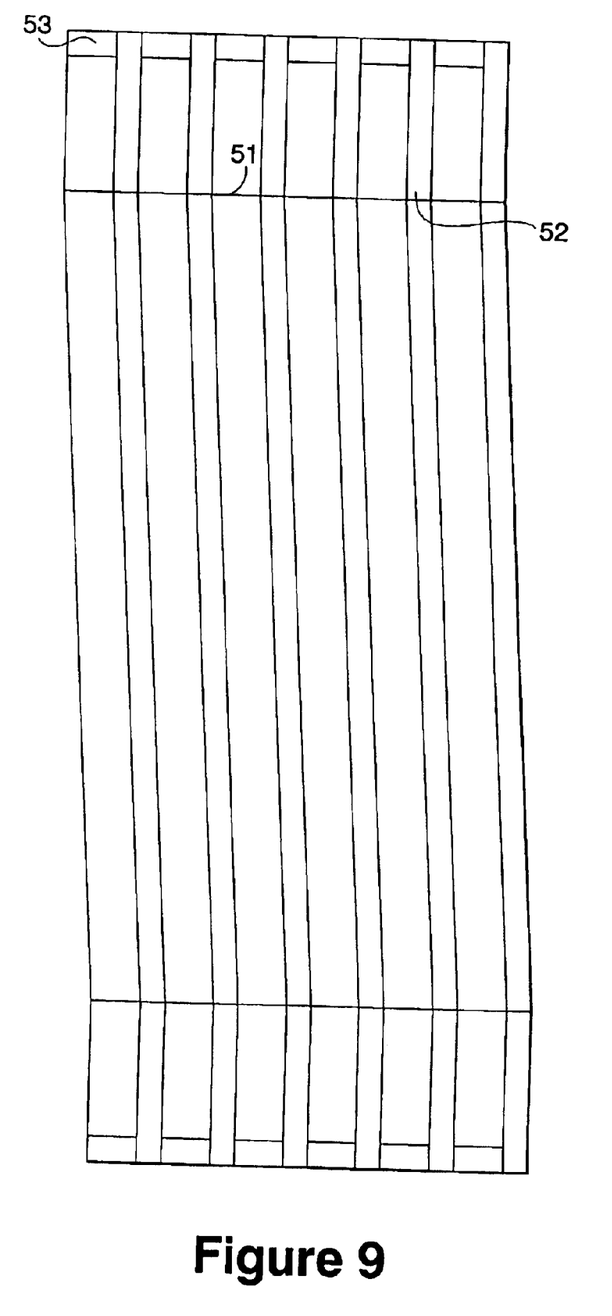
FIG. 9 is an axial schematic view illustrating a stator configuration.

Referring now to FIG. 9, which shows a stack of six coil modules, the coils 1 are shown sandwiched between washers 52 and surrounded on their outer surfaces by spacer rings 53. The modules are arranged to present a constant reluctance to a radially-directed magnetic field from a permanent-magnet armature moving within the washers 2 and for this reason the modules are skewed by one coil axial length as shown. It will be understood that to facilitate the manufacture of such modules the washers may be assembled from two or more layers of stamped material and that the coils and spacers may also be subdivided in an axial direction if required.

In order that the present invention may be more readily understood, various embodiments thereof will now be more particularly described, by way of example, with reference to the accompanying drawings, in which.

Figure 1:
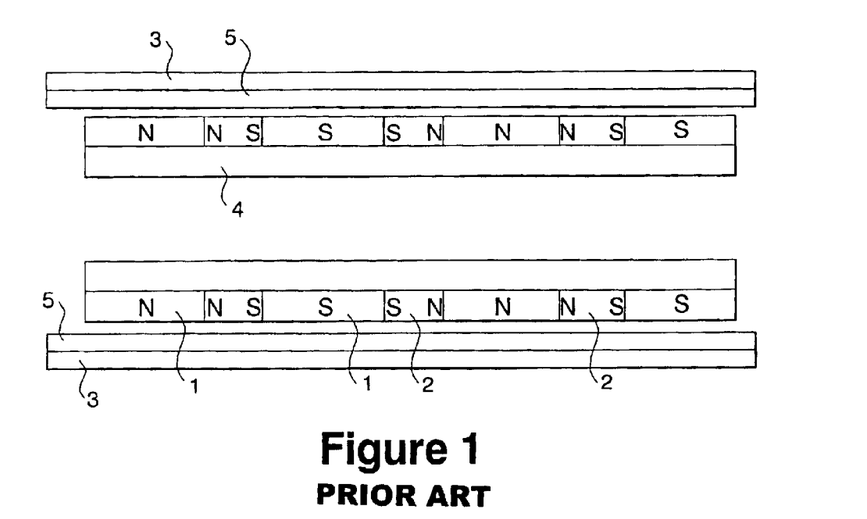
FIG. 1 is a schematic axial sectional view of a prior art linear electromagnetic machine.

Turning now to the drawings FIG. 1 shows a prior art configuration in which the armature, shown as a cylinder, has bands of magnetic material 1 arranged along its length and separated by non-magnetic spacers 2. The magnetic material is magnetised in the radial direction with alternating polarity and the magnetic circuit of each pole pair includes an axial traverse in one direction within an outer steel case 3, and a second axial traverse in the opposite direction within a steel armature core 4. The radial thickness (magnetic length) of each piece of the magnet has to be approximately as great as the thickness of the associated air gap, which includes copper windings 5 of coils of the stator. Further, the axial length of each separator 2 has to be greater than twice the radial length of the air gap so as to minimise axial flux leakage between the two oppositely-magnetised surfaces of the magnetic material. Such leakage flux bypasses the copper coils or intersects them in a non-radial direction and detrimentally affects the performance of the ram. Although not shown, a piston rod or the like is attached to the armature to transfer forces or motion to a load.

The flux density in the coils is less than that leaving the surface of the magnetic material, since the flux is radially outwardly. It follows that to achieve a significant flux density in the copper windings an even greater flux density has to be present at the surface of the magnet—which requires the machine to use an expensive, high-performance magnetic material. Unfortunately, the magnetic materials with the best performance are inherently brittle. A curved shape of any significant radial "thickness" that is the dimension between inner and outer cylindrical or part-cylindrical surfaces will have an outer surface area that is substantially greater than the inner surface area, so that any attempt to magnetise the material sets up high stresses between the radially-orientated domains, which encourages cracks to develop. This prevents the best magnetic materials being used in this way unless they are dispersed in a plastic or resinous medium. As might be expected, such a dispersion technique reduces the performance of the material whilst further increasing its cost.

Since the total flux leaving the outer surface of radially-magnetised material cannot exceed the total flux re-entering the material on its inner surface at a limited flux density, the process of radial magnetisation is, in any case, inherently inefficient for shapes of significant curvature and thickness.

Figure 2:
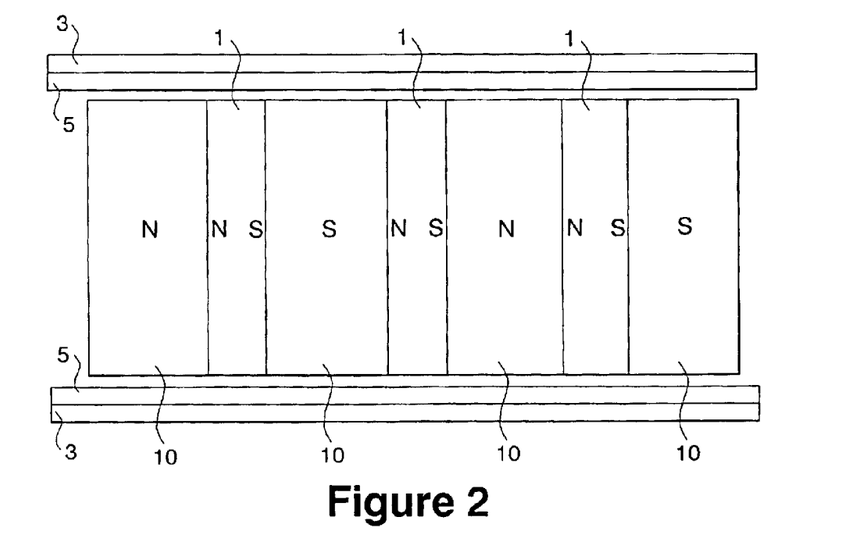
FIG. 2 is an axial sectional view of a machine formed in accordance with the present invention.

The embodiments of the present invention shown in FIG. 2 overcome this disadvantage by utilising flat discs of magnetic material 1, magnetised in the axial direction, and fitted with iron disc polepieces 10. The poles of the magnets are so arranged that they are in opposing pairs, as shown. Thus the flux leaving each magnet in the axial direction is constrained to leave the armature assembly in the radial direction and to intersect the coils 5 before traversing the outer case steel 3 and returning through the coils to enter the opposing polepiece of each disc magnet. The axial thickness (magnetic length) of the magnet disc should now preferably be approximately twice the radial dimension of the air gap, since the flux driven by one magnet crosses the air gap twice.

With this configuration it is possible to use a low-cost (low working flux density) magnetic material but nevertheless to produce a high flux density in the coil volume. This is because the flux density at the polepiece is no longer limited to that of the magnet itself, since the flux leaving the whole area of the magnet disc in an axial direction now leaves the cylindrical periphery of the polepiece in a radial direction and it is possible to arrange for the latter area to be less than the former.

Because the magnetic material itself is now a flat element, it is nevertheless possible to use high-performance magnets in this form of electromagnetic actuator if required. In practice, because presses available for the manufacture of the sintered magnetic materials are limited in the total force that may reasonably be used, there is a limit of about 100 mm in the greatest diameter of one-piece disks which may be produced commercially. Discs of greater diameter could be constructed by the assembly of pre-fabricated and pre-magnetized shapes of smaller area, but this is not considered to be a practical or economic process. There is no corresponding problem associated with the use of lower performance magnetic materials, and commonly-available materials can be used in the construction of large-thrust rams. The relationship between required thrust and minimum copper volume means that it is necessary either to extend the length of the armature, or to increase its diameter, or both, so that the volume of working copper (in the coils) may be correspondingly increased.

Figure 3:
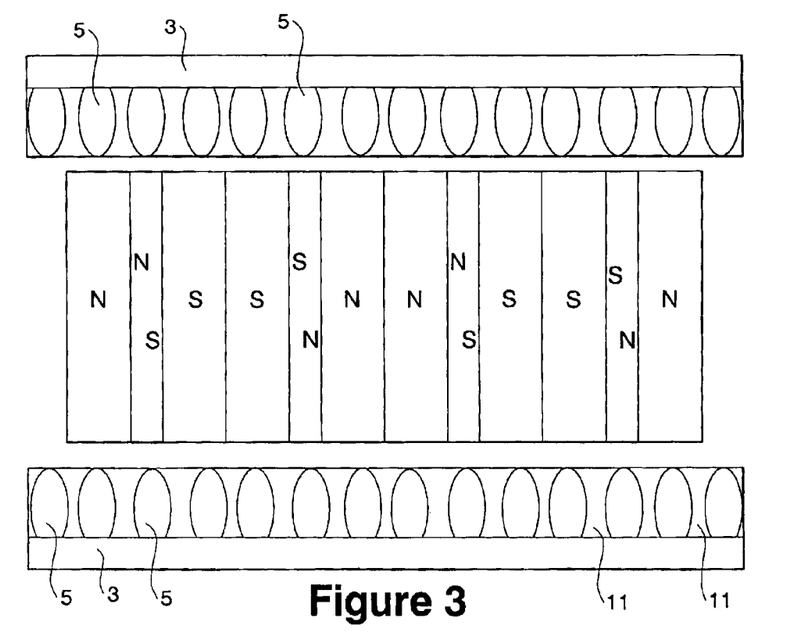
FIG. 3 is an axial sectional view of a second embodiment of the invention.

FIG. 3 is a schematic diagram showing an embodiment in which the copper coils 5 are embedded in slots in a steel stator body 3 separated by radial ribs 5. Although the radial magnetic flux passes through the steel flux conductor ribs 11 the system behaves as though the coils were immersed in a flux which is distributed uniformly across the cylindrical cross-section of the coils and steel taken together. Since the steel may be arranged to have an axial dimension that is smaller than that of the copper slot, the effective flux density in the coil will be a proportionate fraction of the flux density in the steel. The ratio of the radial dimension of the coils slots to their axial dimension might be 2.5:1 and the slots may be tapered and rounded, so as to minimise damage to the coil insulation during assembly.

The stator body 3 is arranged to have a high electrical hoop resistance, so that it does not act as a shorted turn coupled to any of the embedded coils 5. To achieve the highest servo performance of which the machine is capable, the currents in the stator coils need to be modulated rapidly in response to the electronic drive controller; their response would be slowed by the induced current in the stator steel. The loop resistance is therefore increased by cutting a number of slots (not shown) along the full length of the stator in an axial direction. The slots do not penetrate to the full depth of the stator steel but leave the central region undisturbed. This allows the inner surface of the stator to be precisely dimensioned and to be hardened and polished so as to accommodate the bearing rings of the armature.

The air gap between the stator 3 and the armature does not include the copper of the coils 5 (as in the embodiment of FIG. 2) and can therefore be reduced to a low level (typically 1.5 mm or less). It should be noted that, in contrast to common practice in rotary motors, it is not normally a requirement for the armature to be held clear of the stator metal and it may be carried on sliding bearings that press against the inner surface of the stator. The axial symmetry results in no resultant bearing load from magnetic forces.

Figure 4:
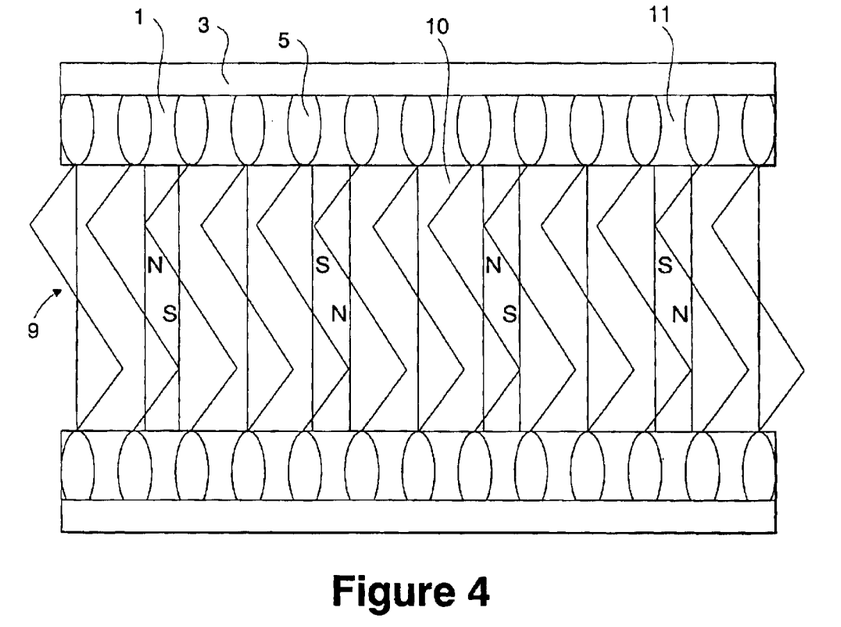
FIG. 4 is a schematic diagram illustrating a variation of the embodiment of FIG. 3.

In order that the strong attractive force shall have no axial component, the steel of the stator may be arranged to have an effectively constant reluctance with respect to the disc polepieces of the armature. This may be achieved, for example, as shown in FIG. 4, by making the path of each stator slot vary in a sinusoidal or sawtooth manner in an axial direction, as shown schematically in FIG. 4. The magnetic reluctance of the system is a function of the total area of steel on the armature that is in close proximity to steel on the stator. It will be clear that, for any change in the axial position of the armature that causes a decrease in mutual reluctance across one diagonal of the polepiece, there is a corresponding increase across an orthogonal diagonal. Thus the polepiece experiences no net axial attraction, nor any rotational torque nor any twisting force.

In these embodiments, because the air gap is small, it is not necessary for the armature magnets to have a significant axial (magnetic) length. This reduces the quantity of magnetic material and thus the materials cost of the actuator. It should also be noted that decreasing the axial thickness of the magnet decreases the magnetic period of the system.

In these embodiments the axial length of the stator coil period is arranged to be equal to one sixth of the armature magnetic period when the machine is required to be controlled by a three-phase servomotor drive unit of the type commonly available worldwide.

Figure 5:
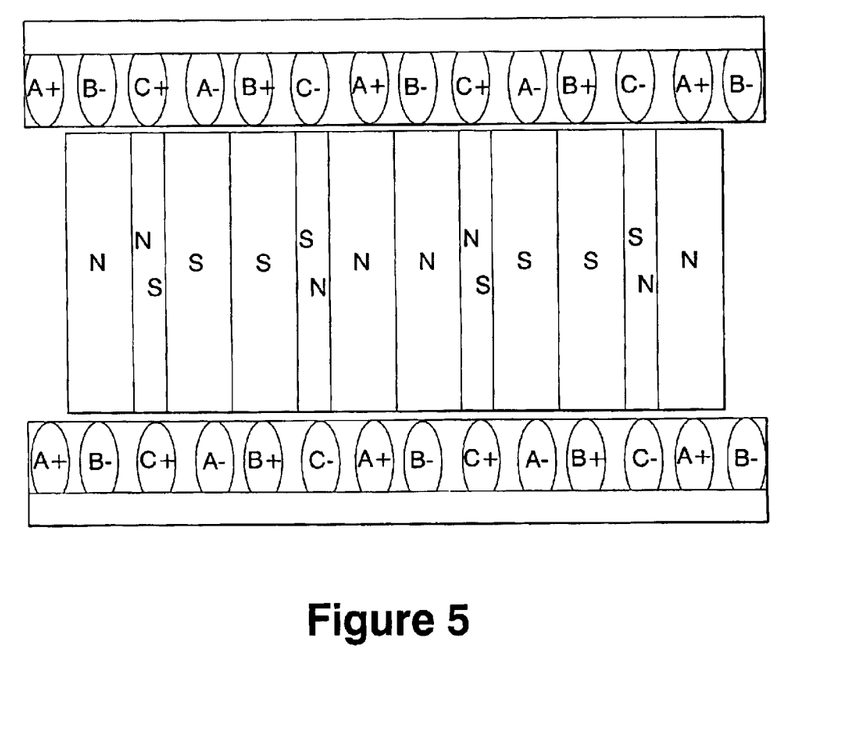
FIG. 5 is an axial sectional schematic view of a machine formed for three phase servo drive.

FIG. 5 illustrates an armature having two magnetic periods. Two and one third magnetic periods of the stator are shown, although it will be appreciated that there may be many more than this over the axial length of a practical machine. In FIG. 5 the armature is shown positioned in relation to the stator such that optimum thrust will be produced if phase A is at 87% of positive maximum, phase B is at 87% of negative maximum and phase C is at zero. Careful study of the arrangement will show that as the armature moves and the relative positions of the armature and stator vary, the optimum phasing of the sinusoidal drive changes smoothly and without any discontinuity.

As a result of this the actuator may be controlled with great precision. Further, the precision of control in relation to the positioning accuracy of the armature is a function of the length of the magnetic period, so that those features which permit the axial length of the magnetic period to be reduced also enhance the positioning accuracy of the machine. A decrease in the axial length of the magnetic period also reduces the weight of the machine by cutting the weight of the polepieces and by reducing the thickness of the outer steel case required to pass the magnetic flux in the axial direction. Because the axial thicknesses of the poles and the radial thickness of the outer steel cylinder are determined by the overall flux in each case, they are also smaller, saving weight.

Figure 6:
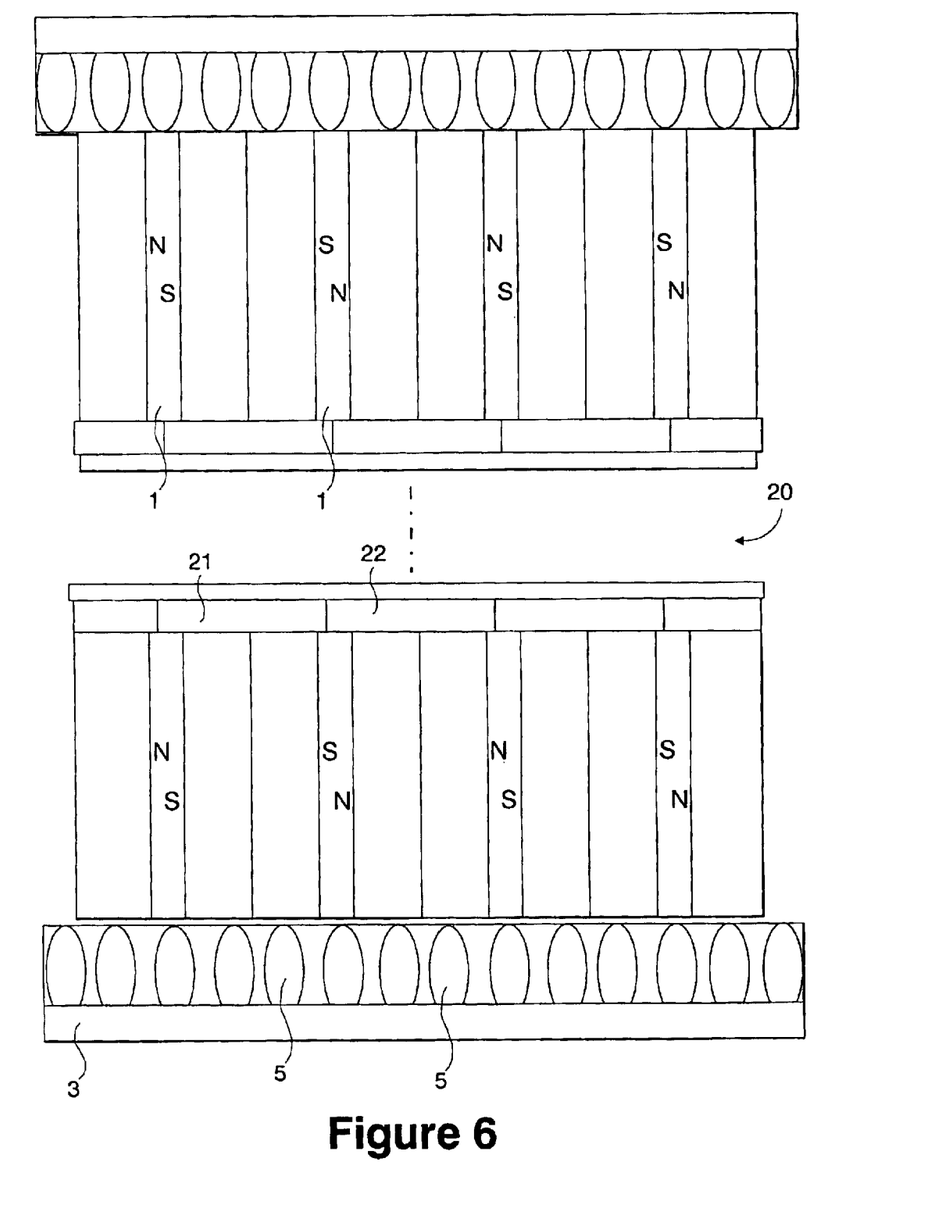
FIG. 6 is an axial sectional view of a part of an alternative embodiment with annular magnets.

FIG. 6 illustrates an embodiment having annular magnets and polepieces. This helps to limit the increase in overall flux as the diameter of the ram is increased. The core 20 of the armature is hollow and a weak field region. However, if the central region of the magnet disc were simply to be omitted, a significant proportion of the flux leaving the surfaces of the magnets would take the short route radially inwards, crossing each air gap across the thickness of the magnet disc in the central core 20 instead of passing radially outwards through the stator 3 and coils 5. The central part of the actuator would not therefore be a low-field volume. The radially inwardly directed flux is limited by introducing an inner core of magnetic element 21 having the same magnetic length as the disc magnets 1 but radially-magnetised in appropriate directions so as to oppose the leakage of flux through the central hole. An inner steel cylindrical member 22, is also produced whose function is to provide a low-reluctance path connecting opposing poles of the radial magnetic material 21, thus reinforcing the action of that material and shielding the central part of the ram from spurious magnetic fields.

This allows the central part of the armature to enclose items that may be sensitive to such magnetic fields, for example a position transducer.

Figure 7:
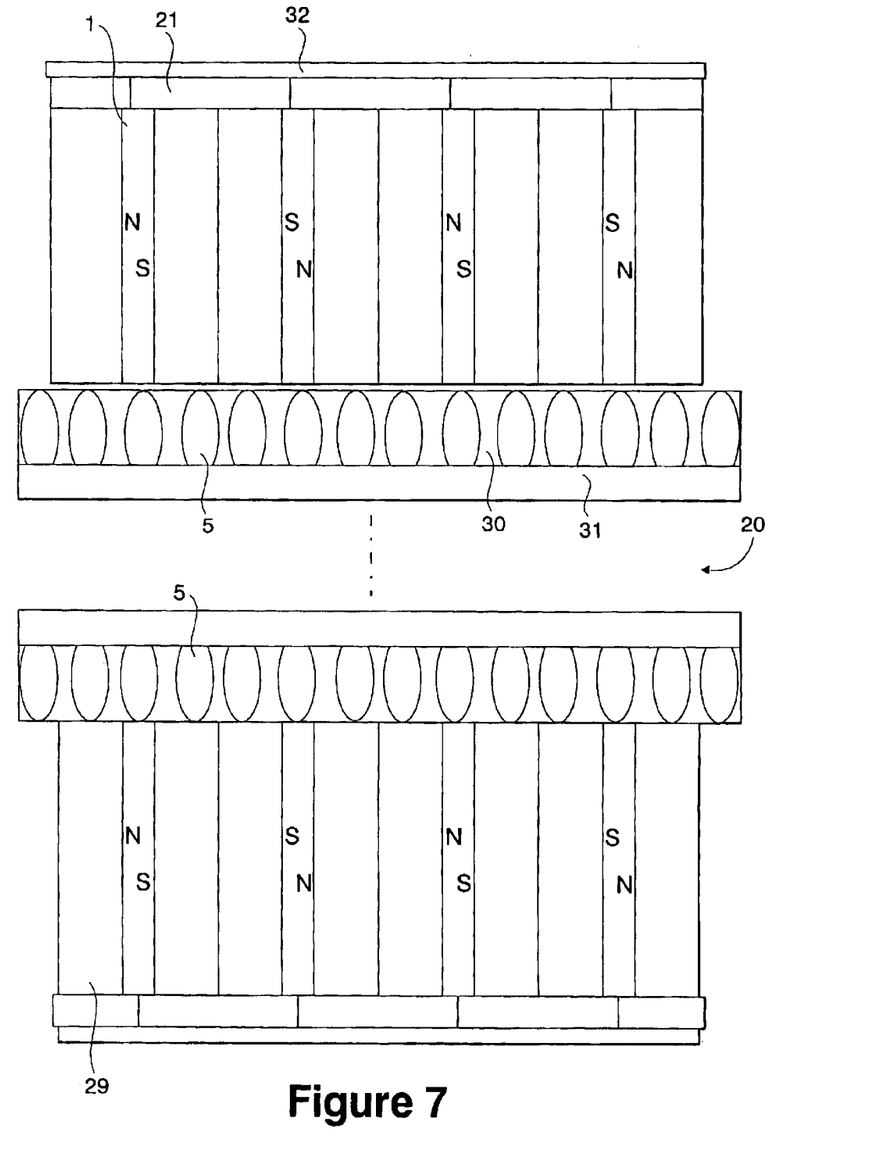
FIG. 7 is an axial sectional view of a further alternative embodiment with annular magnets and an inverse configuration of magnets and coils.

In an alternative embodiment illustrated in FIG. 7 an array of permanent magnets is carried on the stator and an array of coils incorporated within the moving armature. When it is necessary for the stroke of the actuator to be many times greater than the axial length of the armature (such as for a vertical lifting device or for the horizontal movement of sliding doors) it is an advantage that power is only applied to the active parts of the machine, rather to the entire electrical length of the device. In such cases it is appropriate for the electrical power to be applied to a part of the moving armature (perhaps by a linear commutator) instead of the stator. This is also an advantage for several designs of small actuator in which it is appropriate for the magnetic material to be on the outside.

In FIG. 7 an array of planar, axially-magnetised ring magnets 1 produces an axially-alternating flux that is concentrated radially inwards by pole pieces 29 and flows through a slotted armature assembly 30 housing coils 5. The flux completes its path via the inner steel sleeve 31 before returning outwards via the coils to the reverse sides of the axially-magnetised rings. To shield the external environment from the magnetic fields of the stator and to prevent flux leakage radially outwards, a screen of radially-magnetised material 21, having the same magnetic length as the ring magnets 1, is arranged on the outer surface of the stator in such a way as to oppose such leakage. A thin outer steel screen 32 completes the magnetic circuit for the axially-alternating poles of the radially-magnetised material 21.

Figure 8:
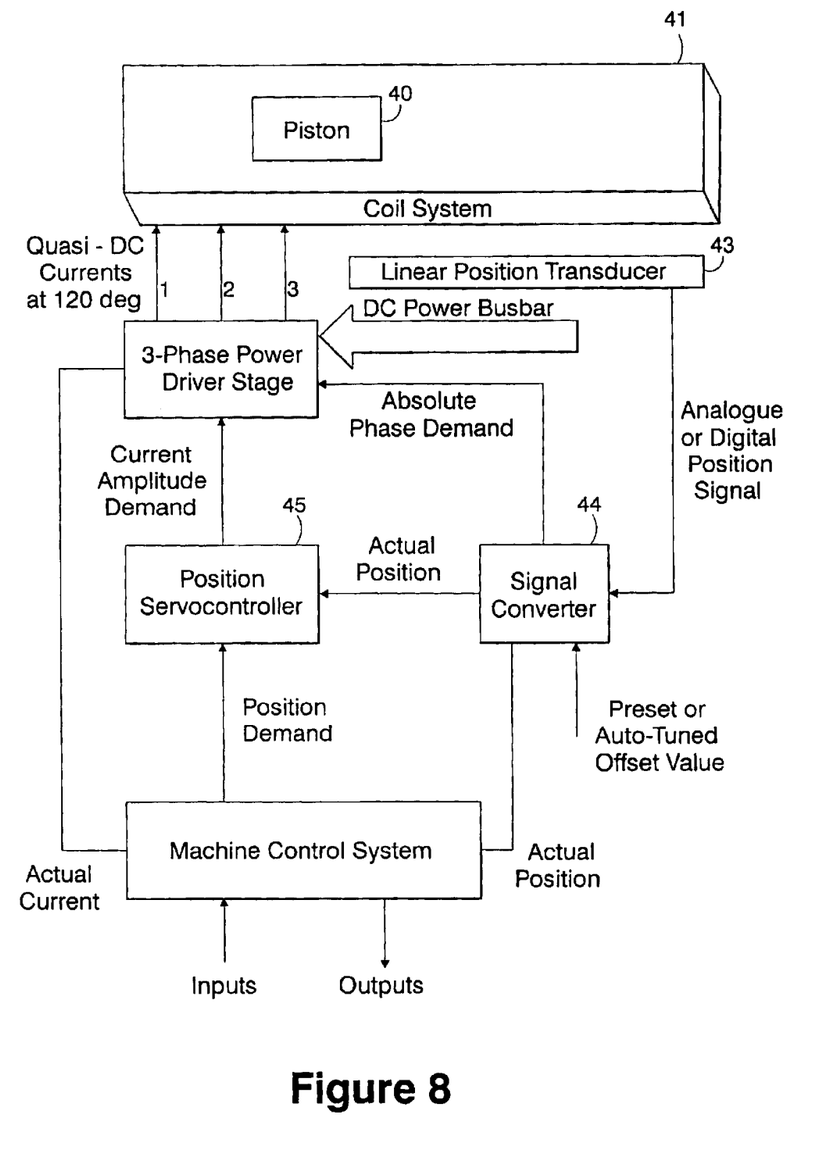
FIG. 8 is a schematic diagram illustrating an exemplary control configuration.

Referring now to FIG. 8 there is shown a control system suitable for controlling a linear electromagnetic machine such as that illustrated in any of FIGS. 3 to 7, with a position demand.

The armature 40 (or piston) is shown schematically displaceable along a stator 41 (again illustrated schematically), having a coil system 42 which may be any of the coil systems illustrated in FIGS. 2 to 7. A position transducer 43 is schematically illustrated alongside the stator 42 although, it will be appreciated, this may be positioned on the armature or piston 40 or in any other position whereby it may produce output signals representative of the position of the armature or piston 40. Its output signal may be in analogue or digital form and is applied to a signal convertor 44.

The signal converter may be a software module, although a fast update rate is necessary and it may be better to perform the conversion operation in hardware.

If the output signal is an analogue one, it is first converted to a numerical value with the appropriate scale and offset parameters so that it represents the true position of the armature in relation to the machine of which the ram forms a part. If the transducer produces an incremental (two phase) digital signal, this is processed by a counter which is reset to zero at the tare or calibration position of the ram. The armature position value is then passed to a servocontroller 45, where it is compared with the desired position, so as to produce a current amplitude demand as previously discussed. The value is also buffered and passed to the overall machine control and monitoring system for a number of other purposes as necessary.

The armature position is then compared with an offset value which defines the starting point of the cyclic phase control system. This offset value may be manually preset or may be determined automatically as part of a starting BITE operation which measures the acceleration of the system at constant current, as a function of a varying offset in a hill-climbing sequence. Since the linear period of the cycle is a fixed value that is defined by the dimensions of the piston, as previously described, the optimum phase angle for any position of the ram can then be passed to the power drive module.

So that the inherent bandwidth of the linear electromagnetic machine or ram may be fully exploited, for many industrial applications the ram controller needs to have a very short cycle time. For example, in a virtual-cam system the machine may need to hold a trajectory to within 100 microns at a speed of 0.5 meter/second. This means that the control loop—including all position-sensor processes, all A-D and D-A processes and the servocontroller computations—should be capable of at least two iterations within the period of the error (200 $\mu$sec).

As a further example, a high-speed traverse may need to be made at 3 meters/second whilst maintaining a position lock to within 100 microns. This would demands a loop cycle time of around 15 $\mu$sec and a power controller frequency response of the order of 1000 KHz if the position lock was to held in relation to a stationary target. Fortunately the target is usually moving at a comparable velocity and a 200 $\mu$sec cycle is adequate.

For motion bases the limits are more relaxed, since the speeds are generally less than 0.5 m/sec and the position tolerances are in the order of 1 mm. A cycle time of 200 $\mu$sec (which, it should be noted, includes the position sensor update time) should therefore be satisfactory.

It is an advantage to use the values of drive current demand (and in certain industrial applications, the values of the instantaneous ram position) in the control system for an associated gas spring as described in the Applicant's PCT application PCT/GB98/02823, the disclosure of which is incorporated herein by reference.

What is claimed is:

1. A linear electromagnetic machine for generating a force acting between first and second members relatively movable along an axis, said first member constituting a stator of said machine, said second member constituting an armature of said machine, one of the said two members including at least one magnet orientated with its direction of magnetisation substantially parallel to said axis of relative movement and having associated pole pieces, the other of said two members having a conductor in which an electric current can be caused to flow, wherein said magnet is annular in form and there is included a ferromagnetic sleeve on that side of said magnet which is remote from the conductor, said pole pieces having a circumferential surface from which a radial magnetic field extends, said radial magnetic field intersecting said conductor of said other member perpendicularly of the direction in which said electric current flows, whereby to generate a force between said two members acting substantially parallel to said axis, the length of said armature along said axis is less than the length of said stator, and an outer casing is provided for resisting the escape of magnetic fields generated within the machine.

2. The linear electromagnetic machine of claim 1, wherein;

said first member includes a plurality of magnets arranged to produce magnetic fields regions of opposite polarity;

said other member has a plurality of conductors in the form of coils through which respective currents can be caused to flow, the axial separation of adjacent coils being approximately one third of the axial separation of adjacent magnetic field regions of said first member.

3. The linear electromagnetic machine of claim 1, wherein the coils of said second member are stacked as a series of identical units each of which has an axial dimension equal to one sixth of the axial distance between like pole centres of said first member;

the coils are wired as three electrically-isolated separate phases, every third coil in axial sequence being allocated the same phase, conductors of the same phase being connected together in series, alternately opposite in terms of the direction of current flow, said second coil in each group of three conductors being connected in the opposite sense to that of its neighbors and three phases are connected together at a star point.

4. The electromagnetic machine of claim 1, wherein at least one of the contiguous surfaces of said two members is adapted to act as a bearing surface for the motion of the other member.

5. The linear electromagnetic machine of claim 1, wherein at least part of the stator of the machine is formed as a gas containment vessel and at least part of the armature of the machine is sealingly slidably engaged within said part of the stator, a compressible fluid housed within the chamber thus defined.

6. The linear electromagnetic machine of claim 1, wherein said stator is substantially cylindrical and said armature is movable axially thereof and located therewithin.

7. The linear electromagnetic machine of claim 1, wherein said ferromagnetic stator body has an axial separation extending throughout its length whereby to increase the circumferential resistance thereof.

8. The linear electromagnetic machine of claim 1, wherein there are further provided means for determining the relative position of the armature and stator whereby to determine the magnitude and sign of the currents to be applied to the coils.

9. The linear electromagnetic machine of claim 2, wherein at least part of the stator is formed as a gas containment vessel and at least part of the armature is sealingly slidably engaged within the said part of the stator, a compressible fluid being housed within the chamber thus defined.

10. The linear electromagnetic machine of claim 1, wherein the axes of the coils are inclined at a constant angle to the said axes.

11. A linear electromagnetic machine for generating a force acting between first and second members relatively movable along an axis, said first member constituting a stator of said machine, said second member constituting an armature of said machine, one of the said two members including at least one magnet orientated with its direction of magnetisation substantially parallel to said axis of relative movement and having associated pole pieces, the other of said two members having a conductor in which an electric current can be caused to flow, said one of said two members has a plurality of magnets, and pole pieces, and said other of said members has a plurality of conductors, the axial length of each magnet and the axial length of each pole piece are the same and equal to twice the radial thickness of the conductor, said pole pieces having a circumferential surface from which a radial magnetic field extends, said radial magnetic field intersecting said conductor of said other member perpendicularly of the direction in which said electric current flows, whereby to generate a force between said two members acting substantially parallel to said axis, the length of said armature along said axis is less than the length of said stator, and an outer casing is provided for resisting the escape of magnetic fields generated within the machine.

12. A linear electromagnetic machine for generating a force acting between first and second members relatively movable along an axis, said first member constituting a stator of said machine, said second member constituting an armature of said machine, one of the said two members including at least one magnet orientated with its direction of magnetisation substantially parallel to said axis of relative movement and having associated pole pieces, the other of said two members having a conductor in which an electric current can be caused to flow, said pole pieces having a circumferential surface from which a radial magnetic field extends, said radial magnetic field intersecting said conductor of said other member perpendicularly of the direction in which said electric current flows, whereby to generate a force between said two members acting substantially parallel to said axis, said second member comprises an axially extending body of ferromagnetic material in which there are a plurality of coils spaced apart axially by separators of ferromagnetic material, and the separators are so shaped as to have a constant radial reluctance with the respect to the pole pieces of the first member and the separators are parallel and skewed with respect to the axis of the machine by an angle such that two diametrically opposed regions of the separators are displaced axially by a distance equal to the axial width of a conductor, the length of said armature along said axis is less than the length of said stator, and an outer casing is provided for resisting the escape of magnetic fields generated within the machine.

13. A linear electromagnetic machine for generating a force acting between first and second members relatively movable along an axis, said first member constituting a stator of said machine, said second member constituting an armature of said machine, one of the said two members including at least one magnet orientated with its direction of magnetisation substantially parallel to said axis of relative movement and having associated pole pieces, the other of said two members having a conductor in which an electric current can be caused to flow, said pole pieces having a circumferential surface from which a radial magnetic field extends, said radial magnetic field intersecting said conductor of said other member perpendicularly of the direction in which said electric current flows, whereby to generate a force between said two members acting substantially parallel to said axis, said second member comprises an axially extending body of ferromagnetic material in which there are a plurality of coils spaced apart axially by separators of ferromagnetic material, and the separators are so shaped as to have a constant radial reluctance with the respect to the pole pieces of the first member and the separators are positioned perpendicular to the axis of the machine and so shaped as to provide a series of slots having a regular cyclic form the axial amplitude of which is equal to the axial width of each of the coils, the length of said armature along said axis is less than the length of said stator, and an outer casing is provided for resisting the escape of magnetic fields generated within the machine.

14. A linear electromagnetic machine for generating a force acting between first and second members relatively movable along an axis, said first member constituting a stator of said machine, said second member constituting an armature of said machine, one of the said two members including at least one magnet orientated with its direction of magnetisation substantially parallel to said axis of relative movement and having associated pole pieces, the other of said two members having a conductor in which an electric current can be caused to flow, said pole pieces having a circumferential surface from which a radial magnetic field extends, said radial magnetic field intersecting said conductor of said other member perpendicularly of the direction in which said electric current flows, whereby to generate a force between said two members acting substantially parallel to said axis, said second member comprises an axially extending body of ferromagnetic material in which there are a plurality of coils spaced apart axially by separators of ferromagnetic material, and the separators are so shaped as to have a constant radial reluctance with the respect to the pole pieces of the first member and the ferromagnetic body is of modular construction and the separators are separated by circumferential spacers the axial length which is equal to the axial width of the coils; the assembly being clamped together by tie rods, the length of said armature along said axis is less than the length of said stator, and an outer casing is provided for resisting the escape of magnetic fields generated within the machine.

15. The linear electromagnetic machine of claim 14, wherein there is included a transducer adapted to sense at least one of the position, velocity and acceleration of one said member of said machine relative to the other, a control unit adapted to respond to the signals from said transducer, said the control unit is adapted to produce three quasi DC drive currents arranged to have a zero sum at all times.

16. The linear electromagnetic machine of claim 15, wherein, the drive currents are defined by the relations;

$I1 = a*\sin(x+\text{offset})$ $I2 = a*\sin(x+\text{offset}+2/3\pi)$ $I3 = a*\sin(x+\text{offset}+4/3\pi)$ where a is the current drive signal, x is an absolute (cyclic) phase command corresponding to the displacement of the armature of the machine from a datum position, and offset is a preset phasing parameter which relates to the datum position of the armature of the machine.

17. The linear electromagnetic machine of claim 15, wherein said armature has associated therewith said transducer for determining at least one of its position, velocity and acceleration, and the magnitude and direction of the current applied to any one coil by said control means is determined by the output from the said transducer.

18. The linear electromagnetic machine of claim 17, wherein the axial dimension of each coil is one sixth of the armature magnetic period and said control means are adapted to supply each set of six coils with three phase current, each pair of coils separated by two other coils receiving the same phase in opposite directions.

19. The linear electromagnetic machine of claim 17, wherein the coils supplied with a given phase are connected in series with alternating polarity.

20. A linear electromagnetic machine for generating a force acting between first and second members relatively movable along an axis, said first member constituting a stator of said machine, said second member constituting an armature of said machine, one of the said two members including at least one magnet orientated with its direction of magnetisation substantially parallel to said axis of relative movement and having associated pole pieces, the other of said two members having a conductor in which an electric current can be caused to flow, said pole pieces having a circumferential surface from which a radial magnetic field extends, said radial magnetic field intersecting said conductor of said other member perpendicularly of the direction in which said electric current flows, whereby to generate a force between said two members acting substantially parallel to said axis, the length of said armature along said axis is less than the length of said stator, and an outer casing is provided for resisting the escape of magnetic fields generated within the machine, wherein the coils follow curvilinear or rectilinear axially sinuous path circumferentially around the said axis.

* * * * *

UNITED STATES PATENT AND TRADEMARK OFFICE
CERTIFICATE OF CORRECTION

PATENT NO. : 6,770,988 B2
DATED : August 3, 2004
INVENTOR(S) : Phillip R. Denne It is certified that error appears in the above-identified patent and that said Letters Patent is hereby corrected as shown below:

Title page,
Item [73], Assignee, please delete "Advanced Motion Technologies Inc." and substitute -- Advanced Motion Technologies LLC --.

Signed and Sealed this

Twenty-second Day of February, 2005

JON W. DUDAS
*Director of the United States Patent and Trademark Office*